United States Patent

[11] 3,564,313

[72] Inventor  Dan Goor
               Lexington, Mass.
[21] Appl. No. 848,465
[22] Filed     Aug. 8, 1969
[45] Patented  Feb. 16, 1971
[73] Assignee  Trans-Sonics, Inc.
               Lexington, Mass.

[54] SELF-COMPENSATING TACHOMETER GENERATOR
     2 Claims, 4 Drawing Figs.
[52] U.S. Cl. ................................................ 310/168
[51] Int. Cl. ................................................ H02k 19/24
[50] Field of Search .................................... 310/46,
     155, 166, 168, 170, 171, 154, 181, 156, 268;
     322/28, 58, 91; 340/274; 178/6; 324/70

[56]                References Cited
              UNITED STATES PATENTS
1,892,371  12/1932  Tuczek .......................... 178/6
2,913,662  11/1959  Hogan ........................... 324/70
3,161,803  12/1964  Knittweis ....................... 310/168
3,230,407   1/1966  Marsh ........................... 310/168

Primary Examiner—Milton O. Hirshfield
Assistant Examiner—R. Skudy
Attorney—Blair Cesari and McKenna ABSTRACT: A tachometer generator has rotor and stator pole pieces which interfit as they move relative to one another so as to provide at least a pair of relatively low reluctance stator-rotor flux paths parallel to the axis of rotation of the rotor.

PATENTED FEB 16 1971
3,564,313
FIG. 1
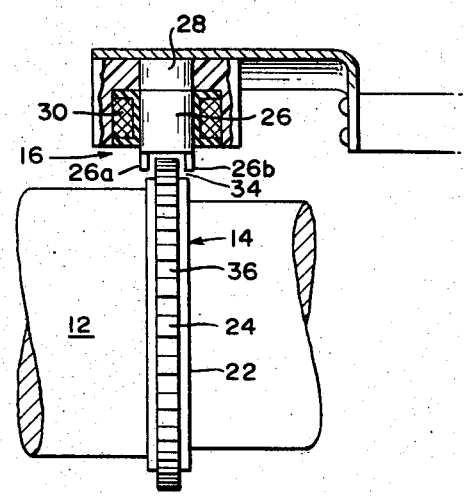
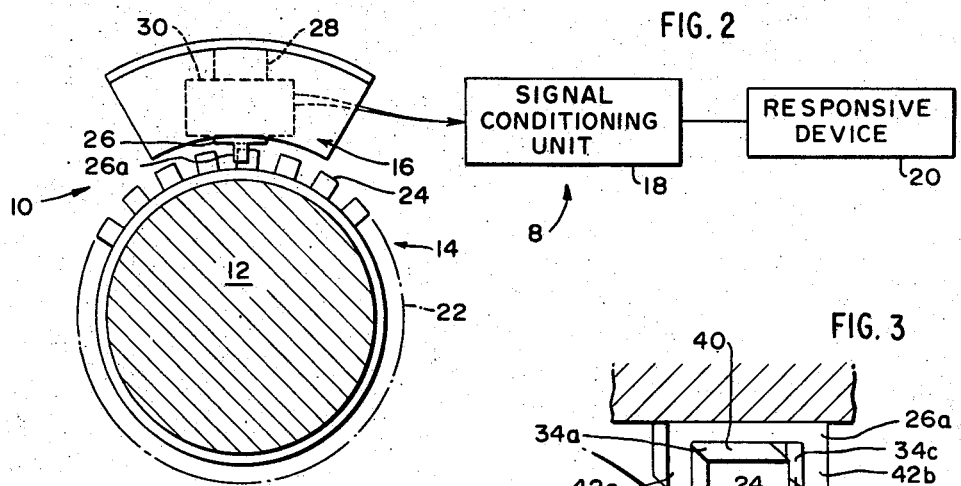
FIG. 2
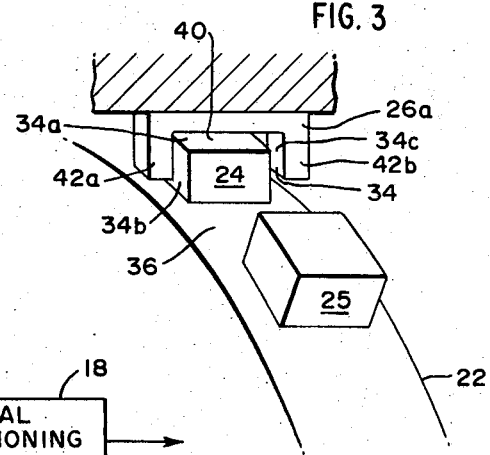
FIG. 3
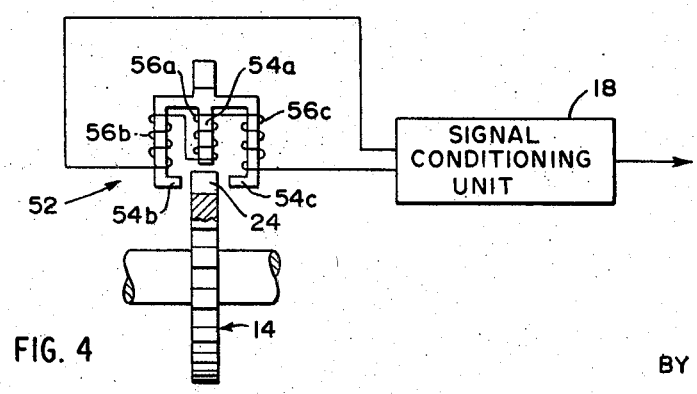
FIG. 4
INVENTOR
DAN GOOR
BY
Blair Cesari & St. Onge
ATTORNEYS

SELF-COMPENSATING TACHOMETER GENERATOR

BACKGROUND OF THE INVENTION

1. Field of the Invention

This invention relates to a tachometer generator. It relates more particularly to a tachometer generator whose output remains relatively unaffected by vibration, shock and the fact that the generator parts and installation tolerances may be relatively loose.

A tachometer is used to measure the speed of rotation of a shaft. The type to which this invention is directed comprises an electrical generator whose rotor is mechanically coupled to the shaft and an output device that converts the signal from the generator to a directly usable form. In one prevalent application, such tachometers are used to indicate the speeds, axles or drive shafts in automobiles. The tachometers of primary concern here are particularly adapted to be parts of electronic antiskid brake controls for automobiles. As such, the present tachometer generator may be used in the tachometer disclosed in U.S. application Ser. No. 835,133, filed June 20, 1969, entitled Tachometer Generator, which application is owned by the assignee of the present application.

2. Description of the Prior Art

The generator in a tachometer is often similar to a conventional electrical generator. An AC generator is commonly used to order to eliminate the brushes needed in DC generators. Also, this permits the use of the generator output frequently as the speed-indicating parameter. The frequency is absolutely proportional to speed and, a more accurate speed indication than the output amplitude, which is not so linearly related to speed.

In many applications, the use of generator frequency largely avoids the effects of various factors that affect the amplitude of the generator signal. These factors include radius variations of the rotor and stator, eccentricity of these parts and other variations encountered in machining and assembling the various parts. However, where low cost is an important factor, manufacturing tolerances have to be relaxed, with a consequent increase in amplitude variations. These variations may then be too great for the devices using the generator output to cope with.

This problem is further complicated in automobile brake-control systems where, because of the nature of automotive assembly, the generator rotor and stator cannot be installed as a preassembled unit. In the early state of assembly, the rotor is affixed to the shaft (or axle) whose speed is to be monitored; and the stator is fixed in place after the shaft has been assembled with its housing. Understandably, this can result in substantial misalignment or rotor and stator, with a great deal of variation in generator output. Further changes may stem from the shock and vibration normally encountered by the undercarriage of an automobile.

The above noted application Ser. No. 835,133 discloses a tachometer generator whose rotor is a toothed, ferromagnetic ring mounted on the shaft or axle whose speed is to be monitored. The stator has a single pole positioned adjacent the ring, a magnet arranged to pass flux through the pole and into the rotor, and also a coil that develops a voltage in response to changes in the stator flux. Movement of the rotor teeth past the stator pole changes the stator flux, causing the coil to develop a signal whose frequency is proportional to the rotor speed. While this generator is well suited for the automotive environment and, indeed, is better adapted for use in brake-control systems than prior tachometer generators used in such systems, further improvement is desirable.

SUMMARY OF THE INVENTION

More specifically, it is an object of the present invention to provide a tachometer generator having relatively wide manufacturing tolerances, yet which develops a relatively strong output signal.

Another object of the invention is to provide a tachometer generator which develops a relatively strong output signal, even through it is subject to shock and vibration in use.

Another object of the invention is to provide an accurate tachometer generator, having the foregoing characteristics, which is relatively easy to install and whose rotor and stator may be separately installed without unduly complicating normal automotive assembly procedures.

Other objects will in part be obvious and will in part appear hereinafter.

The invention accordingly comprises the features of construction, combination of elements, and arrangement of parts which will be exemplified in the construction hereinafter set forth and the scope of the invention will be indicated in the claims.

In its preferred form, the present tachometer generator is similar to the one described in the above-mentioned patent application, although the principles of the invention are also applicable to other generator designs. Accordingly, the rotor is preferably made of a magnet material and has a circumferential array of poles or teeth. A stator, having a single pole, is positioned adjacent the periphery of the rotor so that when the rotor turns, successive teeth thereon move past the end of the stator. This varies the flux between the stator pole piece and the rotor and a coil on the stator develops an output voltage in response to these flux changes, the frequency of this signal being proportional to the speed of the shaft or axle on which the rotor is mounted.

My improvement resides in a unique interfitting of rotor and stator poles which makes the generator output relatively immune to variations in the relative positions of the rotor and stator.

More particularly, in one embodiment of the invention, the end of the stator pole piece facing the rotor is provided with a generally U-shaped notch so that as the rotor turns, its teeth move in succession between the legs of the notch. As each rotor tooth passes through the U-shaped notch, there is a low reluctance path between the tooth and the stator pole piece not only at the end of the tooth but also at the sides thereof. Consequently, substantial magnetic flux passes between the stator and the rotor. This means that as the rotor teeth relative to the stator, there is a relatively large flux change and a correspondingly large voltage induced in the stator coil.

Moreover, this construction permits relaxation of the parts tolerances and assembly standards without seriously weakening the output signal from the generator. For example, even if some of the rotor teeth are shorter than others, a relatively strong magnetic flux passes between the legs of the stator pole piece notch and the sides of these teeth. Consequently, as these shorter teeth move through the stator, there is still sufficient flux change to enable the stator coil to generate a relatively strong output voltage. The same is true if the rotor happens to be slightly eccentric so that the teeth on one side thereof are brought closer to the stator pole piece than those on the other side.

The present generator construction also makes the generator output signal relatively immune to changes in alignment between the rotor and stator pole pieces. These changes may stem from the fact that the rotor is slightly cocked on its supporting shaft or that the stator pole piece is displaced axially relative to a centered position opposite the rotor. These variations may be due to vibration, shock or lax installation procedures. This accommodation of misalignment is due to the fact that any relative sidewise movement between the rotor pole pieces and the stator pole necessarily moves the rotor teeth farther from one leg of the stator notch, but at the same time, closer to the other leg of the notch. Consequently, the total magnetic flux is not unduly changed over a relatively wide range of misalignment.

Thus, the present tachometer generator provides a fairly large amplitude output signal to which other electronic devices in a brake control system can easily respond. Yet, the manufacturing tolerances of the generator components are not too critical and the generator is more easily installed in an automobile because the rotor and stator components do not have to be in perfect alignment.

BRIEF DESCRIPTION OF THE DRAWINGS

For a fuller understanding of the nature and objects of the invention, reference should be had to the following detailed description taken in connection with the accompanying drawings, in which:

FIG. 1 is a fragmentary side elevational view, with parts in section, of a tachometer generator embodying the principles of my invention;

FIG. 2 is an end view of the FIG. 1 generator;

FIG. 3 is an enlarged perspective view showing the rotor and stator pole pieces in greater detail; and FIG. 4 is a diagrammatic view of a modified form of my generator.

DESCRIPTION OF THE PREFERRED EMBODIMENT

Referring now to FIGS. 1 and 2 of the drawing, a tachometer indicated generally at 8 is used to sense the speed of a rotary shaft 12. The tachometer includes a generator 10 comprising an annular rotor 14 affixed to the shaft 12, and a stator 16 closely spaced from the periphery of rotor 14. When shaft 10 rotates, stator 16 develops electrical signals which are applied by way of a signal conditioning unit 18 to a responsive device 20 which may comprise control circuitry for an antiskid brake system or simply an indicating meter. The conditioning unit 18 converts the output of stator 16 to a form which is particularly suited to drive the responsive device 20.

As best seen in FIG. 1, rotor 14 consists of a ring 22 fitted to rotate with shaft 12 and having a peripheral array of radial teeth 24. Ring 22 and teeth 24 are made of a material having a relatively high magnetic permeability material.

Stator 16 comprises a core 26 whose end 26a opposite rotor 14 forms a specially shaped pole piece to be described in detail later. A permanent magnet 28 is positioned at the opposite end of core 26 and a coil 30 around the core develops a voltage in response to flux changes in the core. The ends of the coil are electrically connected to signal-conditioning unit 18.

The flux from magnet 28 passes through core 26 and thence to rotor 14 by way of the intervening air gap 34. The length of air gap 34 is substantially less when a rotor tooth 24 is opposite the pole piece 26a than when an intervening air space 36 is opposite the pole piece. Consequently, the reluctance of air gap 34 decreases and increases as successive teeth 24 and gaps 34 proceed past pole piece 26a during rotation of the shaft 12. The flux through core 26 increases and decreases with these changes in reluctance, thereby inducing a voltage in coil 30. The frequency of this signal is directly proportional to the rotational speed of shaft 12.

Referring now to FIG. 3, the rotor and stator pole pieces 24 and 26a, respectively, coact to minimize the effects of inaccuracies in the rotor and stator components themselves or in their placement relative to one another. More particularly, the rotor and stator pole pieces are shaped to interfit with one another as the rotor turns. The stator pole piece 26a is formed with a generally rectangular recess 40 in its end face. Recess 40 is shaped and positioned so that when shaft 12 rotates, each rotor pole piece or tooth 24 projects appreciably into recess 40. In other words, the pole piece legs 42a and 42b defining channel 40 extend down and overlap each tooth 24 at the opposite sides thereof as the tooth swings by the stator.

This interfitting stator and rotor pole piece construction provides a flux path not only in the air gap portion 34a between the top of each tooth 24 and the bottom of channel 40, but also in the portions 34b and 34c between the opposite sides of tooth 24 and pole piece legs 42a and 42b. Consequently, when each tooth 24 is positioned in the recess 40 in FIG. 3, there is materially greater stator-rotor flux than in prior pole piece arrangements; this results in an increased difference between the maximum flux and the minumum flux which obtains when a rotor air space 36 is disposed opposite the stator pole piece. Accordingly, there is a desirable increase in the output voltage, which corresponds to the change in magnetic flux as successive rotor teeth 24 and spaces 36 pass the stator pole piece 26a.

Moreover, even if the radial length of gap portion 34a should be unusually large due to an eccentricity in shaft 12 or rotor 14, or an unusually short tooth 24 length, or improper positioning of the stator 16, there is still a larger gap in the side portions 34b and 34c of the gap. Therefore, there is still sufficient magnetic flux change to induce a relatively strong and easily sensed voltage pulse in coil 30.

In addition, even if the rotor and stator pole pieces are out of alignment or cocked due to faulty installation of rotor 14 or stator 16, there is always a short air gap portion between at least some parts of the rotor and stator pole pieces. That is, if rotor 14 in FIG. 3 is cocked clockwise, the radial length of a part of air gap portion 34a increases and the length of portion 34c increases. However, this is compensated by a decrease in the length of gap portion 34b. Similarly, if the stator 16 is displaced in the axial direction, the reluctance of one of the gap portions 34b and 34c increases, but this is largely compensated by a decrease in the reluctance in the other gap portion.

It will be obvious also that the output of the present tachometer generator is relatively unaffected by vibrations and shocks encountered by the generator in ordinary use. That is, most such vibrations affect the radial width of air gap 44 or cause misalignment or cocking of the rotor and stator pole pieces. However, the interfitting pole piece construction described above compensates to a large degree for these irregularities; in other words the invention decreases the dependence of output voltage and the relative positions of the rotor 14 and stator 16.

It will be seen from the foregoing then that my improved tachometer generator pole piece construction allows wider latitude in the setting of parts and assembly tolerances. This, in turn, lowers the manufacturing and installation costs of the present system. Yet, at the same time, the present system responds very quickly to changes in shaft speed, even at relatively low shaft speeds.

While we have shown an interfitting rotor and stator pole piece construction wherein the stator pole piece is notched to receive the rotor pole piece, one can produce substantially the same effect by notching the rotor teeth 24 to receive the stator pole piece 26a.

FIG. 4 illustrates diagrammatically another generator embodiment whose stator 52 has three pole pieces, 54a, 54b and 54c, defining the recess 40. The pole piece 54a is opposite the ends of the rotor teeth 24 and the pole pieces 54b and 54c are opposite the sides of the teeth. Three series connected windings 56a, 56b and 56c are disposed on the respective pole pieces. Thus, the output voltage of the generator is the sum of the voltages induced in the windings 56.

The FIG. 4 generator functions in much the same manner as the FIGS. 1—3 embodiment. In particular, the sum of the winding voltage varies, in proportion, much less than the voltage in any individual winding if the rotor and stator are cocked or displaced relative to one another, or the rotor is irregular or eccentric.

It should be noted that the above description relates specifically to a generator whose stator has a single pole, and is applicable to multipole stators. In general, the invention is more readily applied to stators that extend only part way around the rotor than to those that completely encircle it.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

I claim:

1. A tachometer generator comprising:
   A. a rotor:

1. made of material having a high magnetic permeability;
2. mounted for rotation about an axis; and
3. a plurality of pole pieces arranged about said axis; and B. a stator including:
1. a permanent magnet;
2. a stator pole piece positioned opposite the rotor radially outward from the axis thereof, either the rotor pole pieces or the stator pole piece having radial passages for receiving the opposite member so that the rotor and stator pole pieces interfit as they move relative to one another, thereby providing relatively short rotor-stator flux paths generally parallel to the axis so that relatively large changes in the rotor-stator flux from said magnet occur in response to rotation of the rotor; and
3. a winding associated with the stator pole piece and arranged to develop a voltage in response to said flux changes.

2. A tachometer generator as defined in claim 1 wherein each stator pole piece has a notch at its end through which the rotor pole pieces pass as the rotor turns.